United States Patent [19]

Everett et al.

[11] Patent Number: 5,453,329

[45] Date of Patent: Sep. 26, 1995

[54] METHOD FOR LASER CLADDING THERMALLY INSULATED ABRASIVE PARTICLES TO A SUBSTRATE, AND CLAD SUBSTRATE FORMED THEREBY

[75] Inventors: Mark A. Everett, East Windsor; Alan R. Blankshain, Metuchen, both of N.J.

[73] Assignee: Quantum Laser Corporation, Norcross, Ga.

[21] Appl. No.: 52,730

[22] Filed: Apr. 30, 1993

Related U.S. Application Data

[60] which is a continuation-in-part of Ser. No. 894,931, Jun. 8, 1992, abandoned.

[51] Int. Cl.[6] .................................. B22F 7/04; B05D 3/06
[52] U.S. Cl. ..................... 428/565; 428/403; 427/556; 219/121.66; 51/295; 51/309
[58] Field of Search ........................ 427/191, 217, 427/554, 556; 51/295, 309; 428/403, 404, 552, 565; 415/173.4, 173.5, 174.4, 174.5; 219/121.65, 121.66; 416/241 R; 148/512, 525, 903; 419/10, 19

[56] References Cited

U.S. PATENT DOCUMENTS

| | | | |
|---|---|---|---|
| 3,339,933 | 9/1967 | Foster | 277/53 |
| 3,502,493 | 3/1970 | Forestek | 117/22 |
| 4,148,494 | 4/1979 | Zelahy et al. | 415/174.4 |
| 4,184,853 | 1/1980 | Otopkov et al. | 51/295 |
| 4,232,995 | 11/1980 | Stalker et al. | 415/172 A |
| 4,299,860 | 11/1981 | Schaefer et al. | 427/53.1 |
| 4,300,474 | 11/1981 | Livsey | 118/641 |
| 4,399,167 | 8/1983 | Pipkin | 427/217 |
| 4,488,882 | 12/1984 | Dausinger et al. | 51/295 |
| 4,505,720 | 3/1985 | Gabor et al. | 51/295 |
| 4,724,299 | 2/1988 | Hammeke | 219/121 L |
| 4,726,715 | 2/1988 | Steen et al. | 406/55 |
| 4,730,093 | 3/1988 | Mehta et al. | 219/121 LC |
| 4,743,733 | 5/1988 | Mehta et al. | 219/121 LF |
| 4,744,725 | 5/1988 | Matarese et al. | 415/172 A |
| 4,750,947 | 6/1988 | Yoshiwara et al. | 148/12 R |
| 4,804,815 | 2/1989 | Everett | 219/121.6 |
| 4,854,196 | 8/1988 | Mehan | 76/101 R |
| 4,868,069 | 9/1989 | Darrow | 428/610 |
| 4,884,820 | 12/1989 | Jackson et al. | 416/241 R |
| 4,996,114 | 2/1991 | Darrow | 428/610 |
| 5,062,165 | 11/1991 | Chen et al. | 51/295 |
| 5,134,032 | 7/1992 | Cooper, Jr. et al. | 428/403 |

FOREIGN PATENT DOCUMENTS

| | | |
|---|---|---|
| 246828 | 11/1987 | European Pat. Off. |
| 0349661 | 1/1990 | European Pat. Off. |
| 509758 | 10/1992 | European Pat. Off. |
| 3347048 | 2/1986 | Germany . |
| 63-250450 | 10/1988 | Japan .............................. 427/554 |

OTHER PUBLICATIONS

Gas Turbine Rotor Grinds Own Tip Seals, Frank Yeaple, Design News, Jan. 5, 1987.

*Primary Examiner*—Terry J. Owens
*Attorney, Agent, or Firm*—Joseph W. Berenato, III

[57] ABSTRACT

A method of applying abrasive materials to a substrate includes the steps of forming a relatively small pool of superheated molten metal at the surface of the metal substrate by creating an interaction area on the substrate with a localized high energy source. A powder system is injected into the pool. The powder system comprises metal matrix powder and abrasive powder. The abrasive powder includes abrasive particles having an encapsulating thermal insulating layer for preventing the abrasive particles from being melted by the molten metal in the pool. The substrate is then moved relative to the energy source, thereby allowing the pool to resolidify.

27 Claims, 6 Drawing Sheets

METHOD FOR LASER CLADDING THERMALLY INSULATED ABRASIVE PARTICLES TO A SUBSTRATE, AND CLAD SUBSTRATE FORMED THEREBY

RELATED APPLICATIONS

This is a continuation-in-part of application Ser. No. 07/894,931 filed Jun. 8, 1992.

FIELD OF THE INVENTION

The disclosed invention involves the application of abrasive particles onto a turbine blade tip through the use of a laser beam and metal matrix material. More specifically, the invention involves the use of metal matrix material and abrasive particles, the particles being coated with a non-reactive thermal insulating layer chosen from a metal comprising the matrix material and the substrate to prevent the abrasive particles from being melted during the laser application process, applied to a blade tip laser produced molten pool.

BACKGROUND OF THE INVENTION

Gas turbine engines, such as utilized with jet aircraft, are being designed with ever increasing performance requirements. One element of the engine which has been receiving attention is the seal created between the rapidly rotating blades and the surrounding casing. The combustion gases exiting the engine through the rotating blade system should be properly channeled and not be permitted to otherwise escape if efficiencies are to be maximized. It has been the practice to provide the blade tips with abrasive particles which scour the surface of an abradable material mounted in the surrounding casing in order to create a seal which prevents escape of the gases. The blades not only elongate during operation of the engine on account of temperature changes, but also move transverse to their axis of rotation as a result of aircraft operating conditions. Permitting the blade tips to scour the abradable material mounted in the casing allows a very tight dynamic seal to be formed.

Particulates have been applied to blade tips by various means, generally involving some sort of electro-deposition or sintering process. Neither of these processes, however, creates a fusion bond between the particulates and the blade tip. The particulates may become loosened from the tip during operation of the engine, with the result that engine efficiency may diminish over time.

Turbine blades and their tips, as well as various other gas turbine engine components, have recently been manufactured from various nickel based alloys. Attempts have been made to incorporate the particulates into these engine components through use of a laser beam. The nickel based alloys, however, may be precipitation hardenable alloys, so that resolidification subsequent to laser processing causes relatively large and undesirable cracks to be formed in the blade. Furthermore, the density of the particulates is relatively less than the density of the nickel based alloys into which the attempts have been made to physically incorporate the particles, and attempts to reduce the density differences in order to achieve a somewhat more uniform distribution of the particles have been reported. These methods do not, however, appear to be practicable, because of gross crack formation upon resolidification of the melt pool.

The present invention is directed to a method for applying abrasive particulates to a turbine engine blade tip through use of a laser beam. Coated particulates are mixed with a metal matrix, and both the particulates and the metal matrix are fine powders. The metal matrix material minimizes crack formation upon resolidification of the nickel base alloy of the turbine blade because of its content and because a relatively small melt pool is produced. The particulates are coated with a non-reactive material chosen from the metals of which the matrix is comprised and which forms a thermal barrier preventing the particulates from being melted during laser processing, and the surface of the thermal layer melts during processing in order to create a fusion bond with the matrix material which is itself fusion bonded to the substrate.

OBJECTS AND SUMMARY OF THE INVENTION

The primary object of the disclosed invention is to provide a laser-based method for applying abrasive materials to a metallic substrate through the use of a non-reactive thermal insulation coating on the abrasive materials in combination with a metal matrix powder in a manner which prevents gross crack formation.

The method of applying abrasive particles to a substrate comprises the steps of forming a relatively small pool of superheated molten metal at the surface of a metal substrate by creating an interaction area on the substrate with a localized high energy source. A powder system is injected into the pool, the powder system comprising metal matrix powder and abrasive powder. The abrasive powder includes abrasive particles having a nonreactive encapsulating thermal insulating layer chosen from the metals comprising the matrix powder and the substrate for preventing the abrasive particles from being melted by the molten metal in the pool. The substrate is moved relative to the energy source for allowing the pool to resolidify after the matrix material and the surface of the insulating layer have melted.

The method of applying abrasive coatings to a substrate comprises the steps of providing a precipitation hardenable superalloy substrate. A matrix blend is provided and comprises fine metal powder and fine coated particulates. The coating on the particulates is formed from a non-reactive metal, preferably comprising a metal in the matrix material, or a metal comprising the substrate, and provides an encapsulating thermal insulating layer. A superheated molten pool of the superalloy is formed by irradiating a portion of the surface of the substrate with a laser. The matrix blend is dispersed within the pool and irradiation is continued until the metal powder and at least the surface of the insulating layer melt and mix with the superalloy in the pool for thereby forming an alloy mix. The alloy mix is solidified by ceasing irradiation of the pool.

These and other objects and advantages of the invention will be readily apparent in view of the following description and drawings of the above described invention.

DESCRIPTION OF THE DRAWINGS

The above and other objects and advantages and novel features of the present invention will become apparent from the following detailed description of the preferred embodiment of the invention illustrated in the accompanying drawings, wherein.

DETAILED DESCRIPTION OF THE INVENTION

Figure 1:
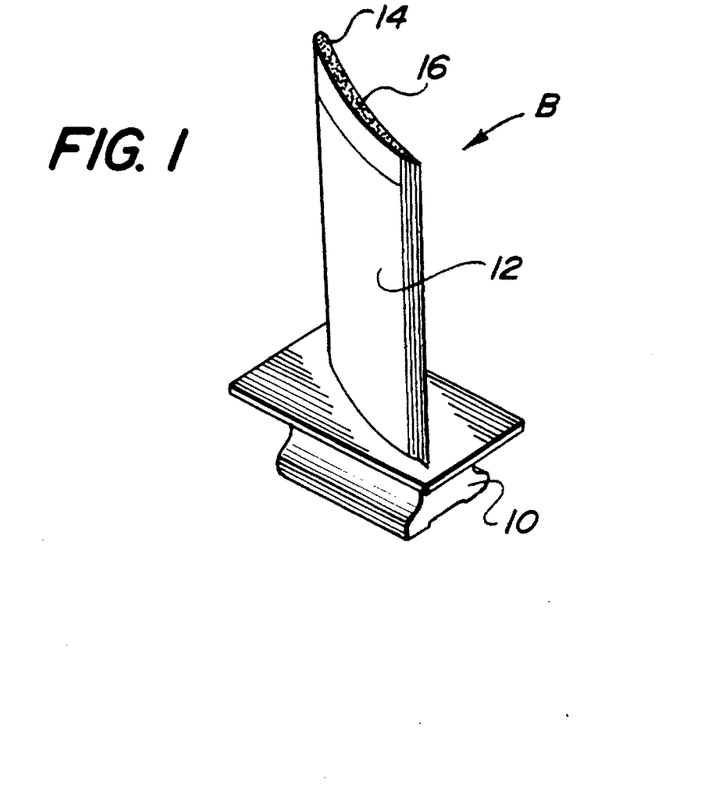
FIG. 1 is a perspective view of a turbine blade and its tip.

Turbine blade B, as best shown in FIG. 1, has a base 10 for attachment to the rotating shaft of a gas turbine engine. Blade 12 extends from base 10. Blade 12 has a tip 14 to which abrasive particles 16 have been applied and which extend outwardly therefrom. The particles 16 are preferably chosen from the group including aluminum oxide, zirconium oxide, chromium carbide, and silicon carbide, although any suitable abrasive particle may be used in practice of the invention. The abrasive particles 16 are uniformly distributed over the tip 14 and have a size range of 80 to 100 mesh.

Figure 2:
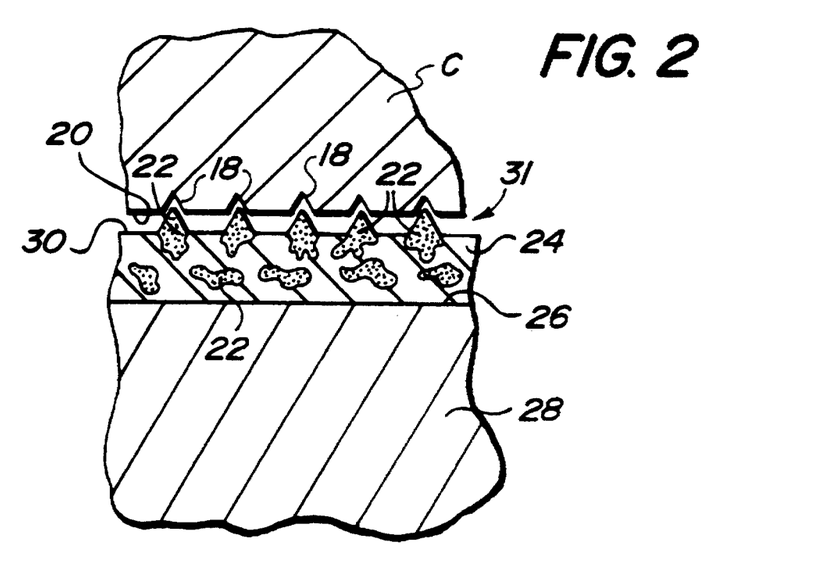
FIG. 2 is a fragmentary cross-sectional view of a turbine blade tip and its surrounding casing.

As best shown in FIG. 2, abradable material C surrounds a turbine blade, such as the blade B, and has a series of grooves 18 scoured into its surface 20. Abrasive particles 22, which correspond to the abrasive particles 16 of the blade B, are disposed within metal matrix material 24 applied to tip surface 26 of blade 28. The particles 22 are substantially uniformly distributed within the metal matrix 24, and a number of the particles 22 extend outwardly from the surface 30 of the resulting matrix and alloy material in order to scour the grooves 18 into the casing C. The matrix material 24 has a relatively low oxidation resistance when exposed to high temperatures, such as occur in a jet aircraft engine, with the result that the matrix material 24 relatively rapidly wears away in order to expose the particles 22. The gap 31 between surfaces 20 and 30 is relatively small in actuality, and thermal elongation of blade 28 or movement of the blade 28 relative to abradable material C of the engine casing, such as may occur during landing and take-off, will reduce gap 31 in order to provide a tight seal for combustion gases.

We have found that the metal matrix material 24 and the abrasive particles 22 may be applied to a substrate, such as the blade 28, through use of a laser system in a manner which substantially eliminates gross crack formation while achieving substantially uniform distribution of the abrasive particles.

Figure 3:
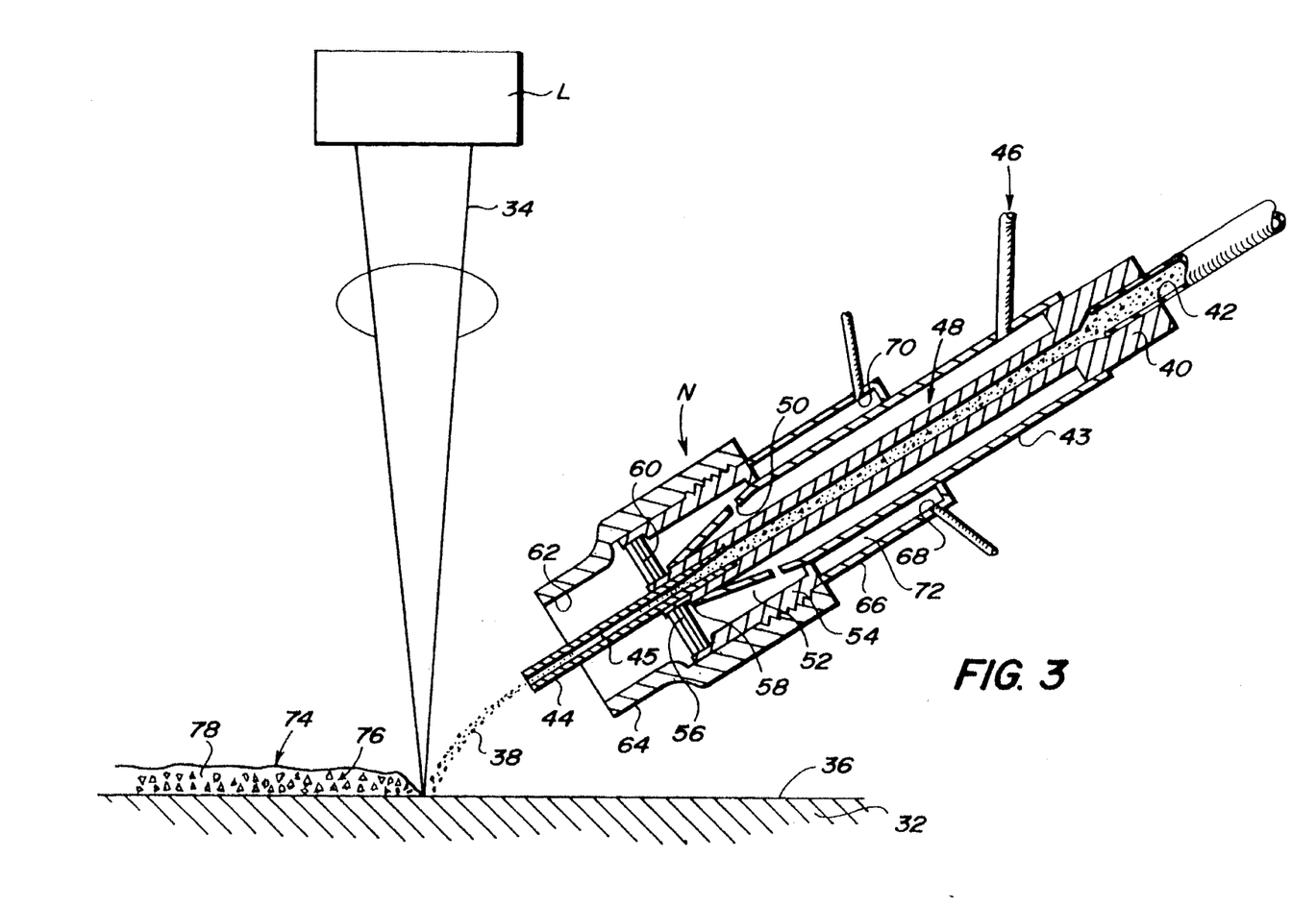
FIG. 3 is a fragmentary cross-sectional view of a laser system applying coated abrasive particulates and matrix material to a substrate.

FIG. 3 discloses practice of the disclosed process by means of a laser source. Although we prefer the use of a laser, those skilled in the art will appreciate that other high intensity energy sources may be utilized, provided that their energy output is localized and that only a relatively small pool of molten metal is formed as a result of the use thereof. A laser source L, having appropriate beam focusing means, is mounted above substrate 32 in order to focus beam 34 thereon. We prefer that the source L be a continuous wave $CO_2$ laser having a power of about 1.2 kilowatts. The beam 34 should be directed by source L in order to be perpendicular to the surface 36 of substrate 32.

Nozzle N, as best shown in FIG. 3, is disposed at an angle to surface 36 and is spaced from beam 34. Nozzle N is spaced from beam 34 a distance sufficient to permit powder particles 38 to be directed into the molten pool of substrate material formed by interaction of beam 34 with substrate 32. The molten pool, as appreciated by those skilled in the art, has a mass substantially less then the mass of substrate 32 so that the substrate 32 may act as a heat sink for rapidly cooling the pool.

Nozzle N includes a core 40 which is connected through opening 42 to a supply of powder particles 38. Body 43 annularly surrounds core 40 and is secured to insert 44 into which the powder particles 38 are directed through opening 45. Body 43 has opening 46 into which a shield gas, preferably an inert gas such as argon, is directed. Annular space 48, into which the pressurized shield gas flows, has an opening 50 in communication with chamber 52 of support bushing 54. Gas diffuser 56 is secured about end 58 of core 40 and within recess 60 for causing the shielding gas to flow through opening 62 of core 64, and preferably comprises one or more overlying screens. Housing 66 surrounds body 43 and abuts support bushing 54. Housing 66 has an inlet 68 and an outlet 70 for cooling water. The cooling water flows about annulus 72.

Turbine blades, such as the blade B of FIG. 1, are currently being manufactured from precipitation hardenable cast superalloys, generally having a predominance of nickel or cobalt. Precipitation hardening of alloys, sometimes known as age-hardening, involves a solution treatment followed by a quench to saturate the solid solution. Quenching is carried out at a temperature where the precipitation rate is exceedingly slow, and after the quench the alloy is reheated to an intermediate temperature at which precipitation is initiated within a reasonable length of time. A very noticeable increase in hardness normally develops during the initial stages of precipitation from a supersaturated solid solution, but the speed at which the substrate solidifies through laser processing is so rapid as to minimize precipitation hardening. U.S. Pat. No. 4,804,815 issued Feb. 14, 1989 to Everett for a Process for Welding Nickel-Based Superalloys is directed to a mechanism for welding precipitation hardenable superalloys having a gamma prime phase, and the disclosure thereof is incorporated herein by reference and the assignee thereof is the assignee hereof.

Substrate 32 of FIG. 3 is comprised of a superalloy, and has a surface 36. Laser beam 34 irradiates a relatively small area on the surface 36 and forms a small pool of superheated molten substrate material. The molten pool formed by irradiation with the beam 34 has a temperature in excess of the melting point of the material from which the substrate 32 is formed, and it is estimated to be at a superheated temperature in excess of 3,000° C. Although some amount of substrate material is vaporized from the molten pool because of the superheated condition, the mass of material which is lost is relatively insignificant.

Into the superheated molten pool is injected a quantity of a powder blend 38 supplied to the core 40 from a powder feeder, such as from a powder feeder of the type disclosed in U.S. Pat. No. 4,726,715 issued Feb. 23, 1988, to Steen et al for SCREW POWDER FEEDERS, the disclosure of which is incorporated herein by reference and the assignee of which is also the assignee hereof. Injection of the powder into the molten pool causes an alloy deposit 74 to be formed on the surface 36 of substrate 32. The deposition of the powder and formation of the molten pool operates essentially continuously, and we have found that a travel speed of 20 in. per minute of the beam 34 relative to the surface 36 at a powder feed rate of about 0.27 to about 0.30 grams per second is sufficient. The deposit 74 has a volume in excess of the volume of the molten pool because of the powder, and therefore extends from surface 36. Because of the relatively small size of the pool, the majority of the material in the deposit 74 is comprised of powder 38, although some minor amount of powder 38 does mix within the molten pool, resulting in a fusion bond between the deposit 74 and substrate 30.

The deposit 74 includes abrasive particles 76 dispersed within the matrix material 78. We prefer that the abrasive particles 76 be essentially uniformly distributed throughout the matrix material 78, and that each abrasive particle 76 be metallurgically bonded to the surrounding matrix material 78.

We have found that the most common and commercially available abrasive materials which are suitable for use in a turbine blade abrasive tip system have such low melting points in relation to the temperature of the melt pool that protection is necessary if the abrasive materials are to remain intact as a result of laser processing and to thereafter be usable for their intended purpose. The most beneficial effect of the abrasive materials is realized when they are small, uniformly distributed, high temperature oxidation resistant particles whose morphology is defined by many sharp, faceted cutting edges. Commercially available abrasive materials include aluminum oxide, zirconium oxide, chromium carbide and silicon carbide, all of which have melting points below 3,000°C., as shown in Table 1.

TABLE 1

| Melting Point Temperatures | |
|---|---|
| Material | Melting Point °C. |
| Aluminum Oxide | 2072 |
| Zirconium Oxide | 2715 |
| Chromium Carbide | 1890 |
| Silicon Carbide | 2700 |

Melt pool temperatures during laser cladding have been estimated to be in excess of 3,000° C., which explains why the noted abrasive materials have been melted during previous attempts to apply them to metal substrates through laser processing. Although the melted abrasive particles may resolidify during laser processing, their distribution and morphology changes from small, uniformly distributed particles with many sharp faceted cutting edges to large, randomly spaced agglomerated masses having rounded features. These changes severely limit the use of laser applied abrasive particles because (1) the sharp faceted cutting edges which provide the abrasive effect are gone, (2) agglomeration and rounding of the particles minimizes their surface area and reduces the strength by which they are held in place, and (3) the random spacing of the large agglomerated masses eliminates an even abrasive effect.

We have found that abrasive particles may be satisfactorily laser deposited if the particles are shielded from the temperature extremes achieved during laser processing. Pretreatment of the particles by uniformly coating them with a layer of a non-reactive material, preferably a metal found in the matrix and/or substrate, provides a thermal gradient or insulation layer effectively protecting the particles from the melt pool temperature. The extent of thermal protection necessary is influenced most significantly by the melting point of both the abrasive particles and the coating material, and the laser produced melt pool temperature. Because the melting point of the abrasive particles and the melt pool temperature cannot be significantly influenced, then our disclosed method relies upon selection and application of the coating material to act as a thermal insulation layer. As a general rule, higher melting point coating materials provide more effective thermal protection for the abrasive particles. The thickness of the coating layer may be selected to provide the required thermal barrier, and may be achieved by encapsulation of the particles in multiple layers of the same or different material. A coating material having a melting point of 1,500° C. applied to a thickness of 100 microns may have the same effect as a 3,000° C. melting point material applied to only a 50 micron thickness. The melting point of the coating material should, however, be below the superheated melt pool temperature so that a metallurgical or fusion bond will be formed between the coated abrasive particle and the surrounding melted metal matrix material. The rapid cooling rates inherent to laser cladding, known to be as high as $10^{6°}$ C./sec., inhibit complete melting of the coating and its encapsulated particle, although the uncoated matrix material is completely melted.

The coating material should be selected not only with regard to its ability to provide thermal protection for the abrasive particle, but also to provide compatibility with the blade material and the metal matrix. We prefer that the coating material be a material also found in the matrix material because this is believed to be helpful in preventing gross crack formation. The service environment is also a factor to be considered. At the minimum, the melting point of the coating material should be greater than the operating temperature of the blade, which for most gas turbine engine section blades is about 1,000° C. Compressor section blades operate at substantially lower temperatures. Nickel based superalloys typically have any one or all of the following elements, all of which satisfy these criteria: nickel, cobalt, chromium, molybdenum, iron, titanium, tungsten, tantalum, hafnium, and niobium. Table 2 lists the melting points for some of these materials. There are other materials which may satisfy the requirements for an effective abrasive particle coating, including not only elemental compositions but alloys and compounds as well. While our preferred method now is to use a coating whose chemical composition is different than the metal matrix, it is recognized that the coating and the matrix material may be of the same composition. A balance must therefore be reached between the thickness of the coating material, the time required to melt the matrix material, and the irradiation of the pool by the laser.

TABLE 2

| Melting Point Temperatures | |
|---|---|
| Material | Melting Point °C. |
| Nickel | 1453 |
| Cobalt | 1495 |
| Iron | 1536 |
| Chromium | 1875 |
| Molybdenum | 2610 |
| Tungsten | 3410 |
| Rhenium | 3180 |

The metal matrix material which is applied to the substrate along with the coated abrasive particles may be selected in order to enhance or otherwise modify the properties of the blade. Because of the temperature extremes found in the melt pool, then some or all of the coating on the abrasive particle melts, depending upon the thickness and melting point of the coating material. The liquified fraction becomes trapped around the abrasive particles due to the rapid cooling and solidification which occurs. Thorough mixing of the melted coating in the melt pool does not occur, so that the deposit is not as homogenous as would occur otherwise. The unmelted portion, if any, remains undisturbed in its encapsulation of the abrasive particles, so that there is a localized region within the now solidified metal matrix which is enriched with coating material. The locally enriched zone may have properties significantly different than the properties of the metal matrix material, so that the deposit properties may be enhanced by selecting a coating for the abrasive particle which provides this enhancement. For example, tip corrosion is known to be a problem at the turbine blade surface, and chromium is a known corrosion inhibitor. Increased concentrations of chromium in the metal matrix material, however, would degrade other important properties which are required for a satisfactory deposit. The use of chromium coated abrasive particles, however, is one means for increasing corrosion resistance within the metal matrix material and the deposit as a whole, because increased chromium concentration is localized around the abrasive particles which are otherwise uniformly distributed throughout the deposit. Thus the tip has enhanced resistance to corrosion, while the blade does not.

A methodology for evaluating the reactivity of any element has its basis in examining electron configurations. An understanding of this procedure includes a consideration of Hund's rule, which states that electrons occupy degenerate orbitals singly to the maximum extent possible and with their spins parallel. Hund's rule is based on the fact that electrons repel one another because they have the same electrical charge. By occupying different orbitals, the electrons remain as far as possible from one another in space, thus minimizing electron-electron repulsions. When electrons must occupy the same orbital, the repulsive interaction between the paired electrons is greater than between electrons in different, equivalent orbitals.

The most stable and therefore non-reactive elements are those with all electron orbitals or energy levels completely filled, as demonstrated by what is known as the rare, noble or inert gases. The elements that are the least stable and therefore highly reactive are those with their outermost electron orbitals or highest energy levels less than half filled. The fact that as the atomic number of the element increases the distinction between the energy levels of the outermost electron orbitals becomes less clearly defined does not confuse this issue. It is recognized that in some cases the energy level of the outermost electron orbitals is so similar that an electron may enter either one of several orbitals. Hund's rule and empirical observations indicate that there is a certain stability associated with elements whose outermost energy levels are half filled. A distinction between reactive and non-reactive elements is thus that reactive elements are those whose outermost electron orbital(s) is (are) occupied by at least one electron but is less than half filled, and non-reactive elements are those whose outermost electron orbital(s) is (are) at least half filled.

Figure 8:
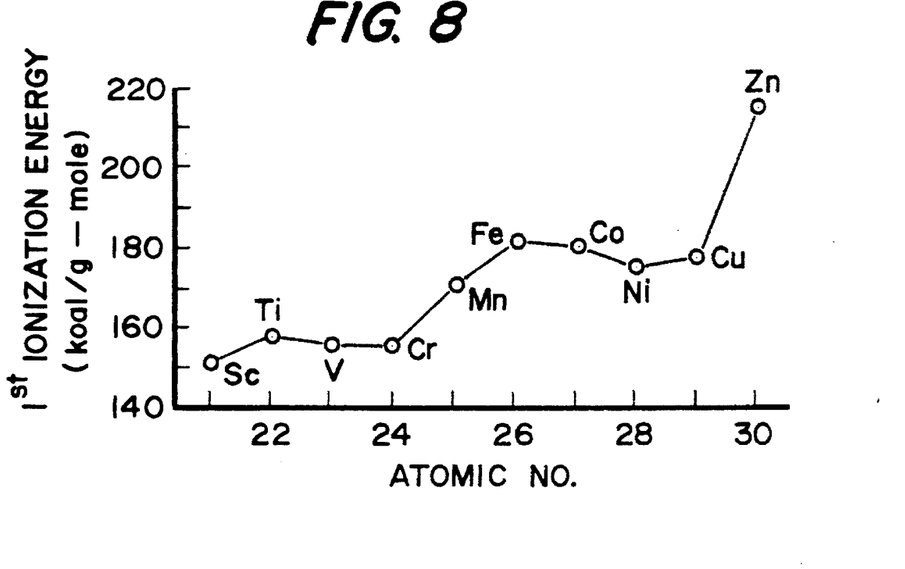
FIG. 8, 9, and 10 are graphs illustrating the first ionization energies as a function of atomic weight for periods 4–6 of the Periodic Table of the Elements.
Figure 9:
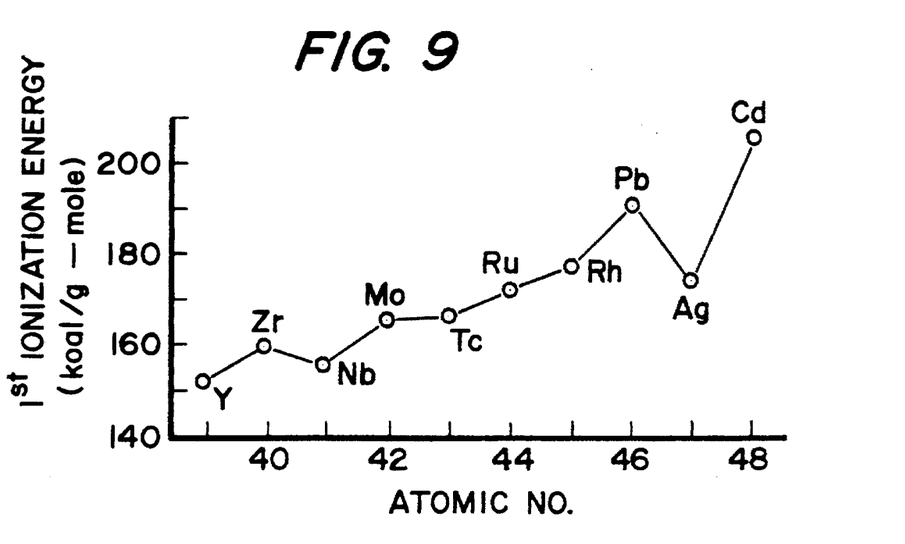
Figure 10:
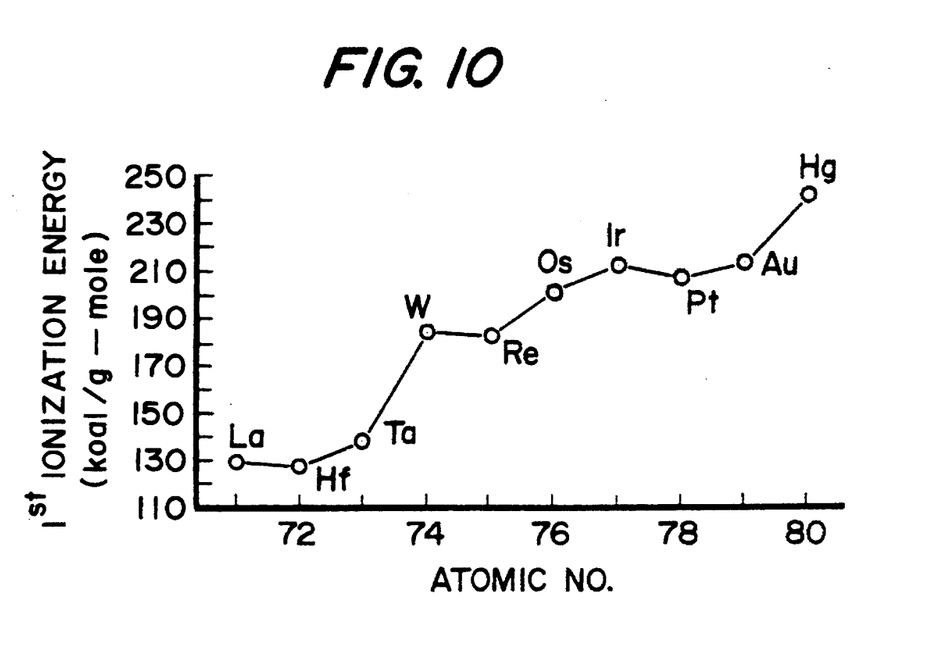

This distinction is illustrated by FIGS. 8–10 and the graphs of the first ionization energies of the elements of periods 4, 5, and 6 of the Periodic Table of the Elements. Group VIB is where the outermost electron orbitals become half filled. As best shown in FIG. 10, the first ionization energies of the sixth period transition elements demonstrate the most pronounced correlation between reactive and non-reactive elements, while the fourth and the fifth periods, as best shown in FIGS. 8 and 9, support the correlation.

In view of FIGS. 8–10, the elements in Groups VIB, VIIB, VIIIB, IB and IIB are considered non-reactive relative to the reactive elements of Groups IIIB, IVB and VB. It is not desirable to use reactive elements for coating the abrasive particles of the invention because the reactive metals exhibit a greater tendency to react with the abrasive particles and thereby may detrimentally affect their properties.

Figure 4:
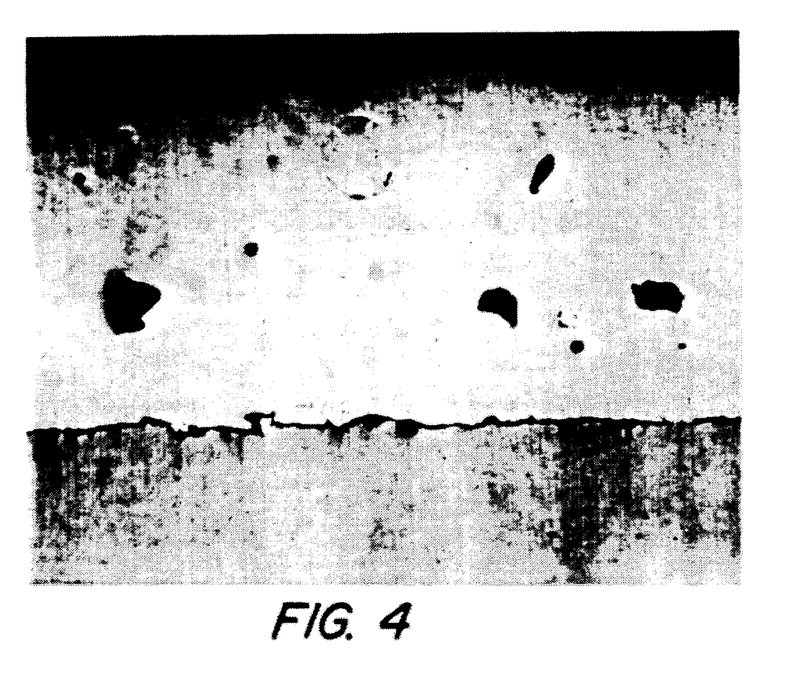
FIG. 4 is a photomicrograph of the interface between the matrix/abrasive medium as applied to a substrate.
Figure 5:
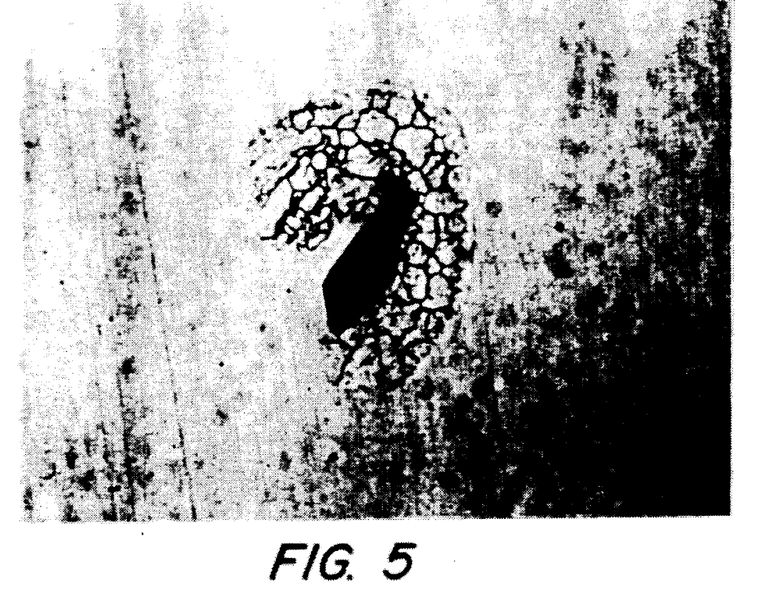
FIG. 5 is an enlarged photomicrograph illustrating an abrasive particulate of FIG. 4.

Photomicrographs 4 and 5 illustrate the results of laser cladding a substrate with zirconium oxide abrasive particles coated with elemental nickel to a thickness of from about 75 to about 100 microns. Zirconium oxide was procured from Zirconia Sales, Atlanta, Georgia, under designation FSD 40 mesh. The zirconium oxide was sized to −80/+100 mesh (149–177 microns). The zirconium oxide was a fused, partially stabilized material. The crystal structure was a combination of both cubic and monoclinic phases. The nickel coating was applied by the Specialty Metal Products Division of Sherritt Gordon Limited, Fort Saskatchewan, Alberta, Canada. The nickel coating was applied to the zirconium oxide particles through a hydrometallurgical process.

The nickel coated zirconium oxide abrasive particles were mixed to a 50% volume ratio with powdered Hastelloy X™ alloy, having a mesh size of −80/+325, as the metal matrix material. Hastelloy X is a strong, oxidation resistant, nickel based, high temperature alloy used in the gas turbine industry. Its nominal chemical composition is Ni-22Cr-19Fe-9Mo, and its complete chemistry is defined by the Unified Numbering System ("UNS") as N06002.

The deposit of photomicrograph 4 was applied with a laser power of 1.2 kilowatts, a travel speed of the beam relative to the pool at 20 in. per minute, and a powder feed rate of 0.27 grams per second. Observation of the deposit of photomicrograph FIG. 4 by optical microscopy revealed that the deposit consisted of zirconium oxide particles surrounded by nickel enriched zones in a Hastelloy X matrix fusion bonded to a metallic substrate. Photomicrograph 5 is an enlarged photograph of one of the zirconium oxide particles, and clearly illustrates the nickel enriched zone within the matrix material surrounding the particle. The nickel coating was partially dissolved within the surrounding matrix material as can be seen in photomicrograph 5, and melting of the nickel coating therefore created a fusion bond between the resolidified coating and the surrounding matrix material.

Figure 6:
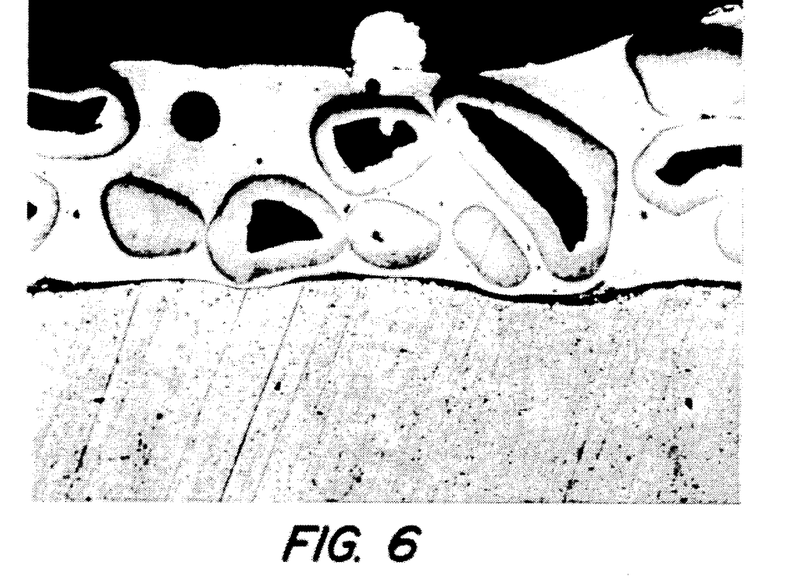
FIG. 6 is a photomicrograph illustrating the interface between the matrix/abrasives and the substrate according to the invention.
Figure 7:
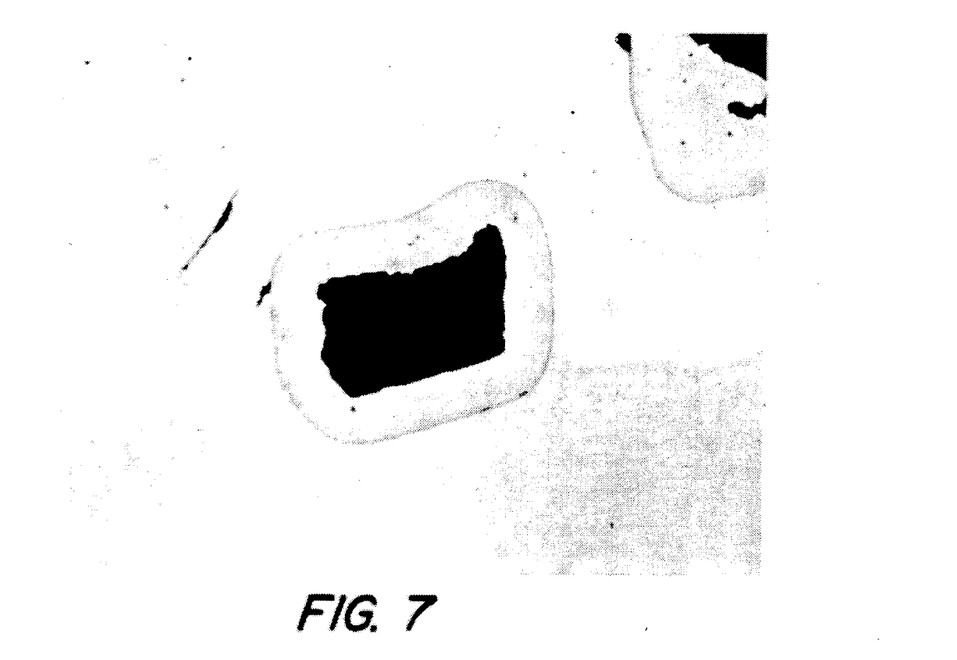
FIG. 7 is an enlarged photomicrograph illustrating one of the abrasive particles of FIG. 6.

Photomicrographs 6 and 7 illustrate the results of testing aluminum oxide particles encapsulated in a tungsten coating. The tungsten coating was 50 microns thick, and was applied to the aluminum oxide particles by a chemical vapor deposition process. The aluminum oxide was purchased from Norton Company of Worcester, Mass., under product name 38 Alundum® size 90 grit. The aluminum oxide was sized at −80/+100 mesh (149–177 microns). The tungsten coating was applied by Ultramet of Pacoima, Calif.

The tungsten coated aluminum oxide abrasive particles were mixed to a 50% volume ratio with powdered Haynes 230™ alloy, having a mesh size of −80/+325, as the metal matrix material. Haynes 230 is a nickel based alloy known for its high temperature strength, oxidation resistance, and thermal stability. Its nominal chemical composition is Ni-22Cr-14W-2Mo, and its complete chemistry by the UNS is N06230.

Photomicrographs 6 and 7 establish that a fusion welded deposit resulted from traversing the metallic substrate beneath the laser beam while adding the blended powder. The laser power was 1.2 kilowatts, the travel speed 30 in. per minute, and the powder feed rate 0.30 grams per second. Photomicrographs 6 and 7 were examined and it was determined that they consisted of an abundance of aluminum oxide particles surrounded by tungsten enriched zones in a Haynes 230 matrix welded to the metallic substrate. In photomicrograph 6, it can be seen that the tungsten coated aluminum oxide particles are relatively uniformly distributed throughout the matrix deposit. Photomicrograph 6 clearly discloses the fusion zone between the matrix material and the underlying substrate. Photomicrograph 7 discloses the solid abrasive particle, surrounded by its tungsten coating, which has been fusion bonded to the matrix. It is preferred that at least the surface of the coating melt in order to provide a fusion bond with the matrix material which is melted by the beam.

Those skilled in the art will appreciate that the laser cladding of the metal matrix and abrasive particles to a substrate, such as the substrate 32 of FIG. 3, results in a somewhat irregular exposed surface. The resulting surface should be machined or otherwise worked to design specifications. Machining of the deposit will remove a certain amount of the matrix material, thereby further exposing the hard abrasive particles. Exposure of the particles through machining, when combined with the wear which the matrix normally exhibits, further contributes to exposure of the abrasive particles and allowing them to scour the surface of the surrounding abradable seal.

We have found that the particle size, for both the matrix material and the abrasive particles, is limited by considerations of the powder feeder being used, and the coating thickness. In addition, relatively large particles may not sufficiently flow, thereby contributing to difficulties in laser cladding. Also, should the particles be relatively large, then too much energy is required to sufficiently melt the surrounding encapsulating protective coating or the matrix material. Fine mesh particles are therefore preferred, and the abrasive particles should have an irregular, sharp, faceted shape.

While this invention has been described as having a preferred design, it is understood it is capable of further modifications, uses and/or adaptations of the invention following in general the principle of the invention and including such departures from the present disclosure as come within known or customary practice of the art to which the invention pertains, and as may be applied to the central features here and before set forth, and fall within the scope of the invention of the limits of the appended claims.

What we claim is:

1. The method of applying abrasive particles to a substrate, comprising the steps of:
    a) forming a pool of super heated molten metal at the surface of a metal superalloy substrate by creating an interaction area on the substrate with a high energy source;
    b) injecting a powder system into the pool, the system comprising metal matrix powder and abrasive powder and the abrasive powder including abrasive particles having an encapsulating thermal insulating layer bonded thereto and said layer being a non-reactive metal chosen from the group consisting of metals in Groups IB, IIB, VIB, VIIB, and VIII of the Periodic Table of the Elements for preventing the abrasive particles from being melted by the molten metal in the pool; and
    c) moving the substrate relative to the energy source and thereby allowing the pool to solidify.

2. The method of claim 1, wherein:
    a) the thermal insulating layer has a melting point in excess of the melting point of the encapsulated abrasive particle.

3. The method of claim 1, wherein:
    a) the thermal insulating layer has a melting point less than the temperature of the superheated molten metal of the pool.

4. The method of claim 1, wherein:
    a) the abrasive particles are encapsulated in an insulating layer having a melting point in excess of the melting point of the abrasive particles.

5. The method of claim 1, wherein:
    a) the abrasive particles are selected from the group consisting of aluminum oxide, zirconium oxide, chromium carbide, and silicon carbide.

6. The method of claim 1, wherein:
    a) the thermal insulating layer is selected from the group consisting of nickel, cobalt, iron, rhenium, chromium, molybdenum, tungsten, and alloys thereof.

7. The method of claim 1, including the step of:
    a) selecting the abrasive powder from the group consisting of zirconium oxide particles having as the thermal insulating layer a nickel coating and aluminum oxide particles having as the thermal insulating layer a tungsten coating.

8. The method of claim 1, wherein:
    a) the powder system has and equal volume ratio of the matrix powder to the particulate abrasive particles.

9. The method of claim 1, wherein:
    a) the abrasive particles are encapsulated in an insulating layer having a thickness not exceeding 150 microns.

10. The method of claim 1, wherein:
    a) the substrate is a precipitation hardenable alloy; and
    b) the matrix powder is comprised of a metal preventing crack formation in the substrate during solidification of the pool.

11. The method of claim 1, including the step of:
    a) providing as the particles an abrasive material having as the thermal insulating layer an elemental metal coating.

12. The method of claim 10, wherein:
    a) the matrix powder has a weight predominance of one of nickel and cobalt.

13. The method of claim 1, wherein a plurality of coatings form the thermal insulating layer.

14. The method of claim 1, wherein:
    a) the metal alloy substrate is chosen from the group consisting of nickel and cobalt superalloys.

15. The method of claim 14, wherein:
    a) the encapsulating thermal insulating layer is chosen from the group consisting of non-reactive metals comprising the matrix powder.

16. The method of claim 1, wherein the substrate is a gamma prime hardened material.

17. The method of applying an abrasive coating to a turbine blade, comprising the steps of:
    a) providing a turbine blade formed from a precipitation hardenable superalloy;
    b) providing a matrix blend comprising fine metal powder and fine coated particulates, the coating on the particulates being directly bonded thereto and being an encapsulating thermal insulating layer formed from a non-reactive metal selected from the group consisting of metals in the metal powder;

c) forming a superheated molten pool of the superalloy by irradiating a portion of a surface of the turbine blade with a laser;

d) dispersing the matrix blend into the pool and continuing to irradiate the pool until the metal powder and at least the surface of the insulating layer melt and mix with the superalloy in the pool and thereby form an alloy mix; and e) solidifying the alloy mix by ceasing irradiation of the pool.

18. The method of claim 17, including the step of:
a) selecting as the metal of the coating a metal from Groups VIB, VIIB, VIIIB, IB, and IIB of the Periodic Table of the Elements.

19. The method of claim 17, including the step of:
a) selecting for the superalloy a superalloy having a predominance by weight of one of nickel and cobalt.

20. The method of claim 19, including the step of:
a) selecting the metal of the coating from the group consisting of nickel, cobalt, iron, rhenium, chromium, molybdenum, tungsten, and alloys thereof.

21. The method of claim 20, including the step of:
a) selecting the particulates from the group consisting of oxides or carbides of aluminum, zirconium, chromium, and silicon.

22. The method of claim 17, including the step of:
a) providing the particulates with a coating from about 5 to 150 microns thick.

23. The method of claim 17, wherein:
a) the coating is formed from a plurality of layers.

24. The method of claim 17, wherein said dispersing step is carried out by injecting the matrix blend into the pool at a rate of from about 0.27 to about 0.30 grams per second.

25. The method of claim 24, wherein:
a) the matrix blend has equal volume proportions of the metal powder and the coated particulates.

26. The method of claim 17, wherein the superalloy is gamma prime hardened.

27. The product of the process of claim 17.

* * * * *